United States Patent
Lupke

[11] Patent Number: 6,050,805
[45] Date of Patent: Apr. 18, 2000

[54] EXTRUSION EQUIPMENT HAVING MEANS FOR ADJUSTING A DELIVERY END OF A DIE WITH RESPECT TO THE EXTRUDER FOR ALIGNMENT WITH DOWNSTREAM EQUIPMENT

[76] Inventor: Manfred Lupke, 10 McLeary Court, Concord, Ontario, Canada, L4K 2Z3

[21] Appl. No.: 08/416,712

[22] PCT Filed: Oct. 28, 1993

[86] PCT No.: PCT/CA93/00465

§ 371 Date: Feb. 26, 1997

§ 102(e) Date: Feb. 26, 1997

[87] PCT Pub. No.: WO94/09964

PCT Pub. Date: May 11, 1994

[30] Foreign Application Priority Data

Oct. 30, 1992 [CA] Canada ................................. 2081848

[51] Int. Cl.[7] .................................................. B29C 47/22
[52] U.S. Cl. .................................. 425/326.1; 425/133.1; 425/192 R; 425/336; 425/377; 425/380; 425/381; 425/392
[58] Field of Search .......................... 425/190, 192 R, 425/133.1, 233, 326.1, 327, 336, 377, 380, 381, 396, 392

[56] References Cited

U.S. PATENT DOCUMENTS

| | | |
|---|---|---|
| 1,368,658 | 2/1921 | Royle .................................. 425/192 R |
| 3,357,051 | 12/1967 | Zolotarevsky . |
| 4,846,660 | 7/1989 | Drossbach ............................. 425/133.1 |
| 4,995,800 | 2/1991 | Lupke ................... 425/133.1 |
| 5,123,827 | 6/1992 | Lupke ................... 425/133.1 |
| 5,511,964 | 4/1996 | Hegler et al. ......................... 425/133.1 |

FOREIGN PATENT DOCUMENTS

| | | |
|---|---|---|
| 0113071 | 7/1984 | European Pat. Off. . |
| 0239046 | 9/1987 | European Pat. Off. . |
| 0420019 | 4/1991 | European Pat. Off. . |

*Primary Examiner*—Harold Pyon
*Assistant Examiner*—Joseph Leyson

[57] ABSTRACT

In heavy extrusion equipment where alignment with downstream equipment is necessary, adjusters 34 are provided for adjusting the position of the extrusion die (14) with respect to the extruder (12). In practice it is possible to provide a die with a split housing one part of which is adjustable with respect to the other, one of the die parts (14) being fixedly connected to the extruder (12), or by providing a two part die, the parts of which are adjustable with respect to each other. The invention may be utilized for alignment of an extrusion die with downstream equipment such as tooling, tooling dies, sizing tables, etc. and also in corrugations for single and double walled pipe.

12 Claims, 5 Drawing Sheets

EXTRUSION EQUIPMENT HAVING MEANS FOR ADJUSTING A DELIVERY END OF A DIE WITH RESPECT TO THE EXTRUDER FOR ALIGNMENT WITH DOWNSTREAM EQUIPMENT

FIELD OF THE INVENTION

This invention relates to apparatus for forming elongate thermoplastics material extrusion especially to apparatus for forming thermoplastics material profiled pipe such as helically or annularly ribbed or corrugated pipe. In large extrusion apparatus requiring alignment between the die and downstream equipment, it is conventional to adjust the position of the extruder carrying the die or the position of the downstream equipment, or both. The downstream equipment may be, for example, tooling, tooling dies, sizing tables, etc.

For example, when forming pipe in a mold tunnel, extrudate is extruded through an elongate nozzle of annular cross section into the tunnel to form the pipe. It is very important that the elongate nozzle be axially aligned with the tunnel so that even thickness of extrudate is deposited evenly on the walls of the tunnel. This has presented a considerable problem in the art.

The machinery involved for making pipe of large diameter, say, for example, a diameter of more than one foot, is very massive. When even larger diameter pipe is needed the machinery is even more massive. Nevertheless, it is conventional to align the elongate nozzle either by adjustment of the position of the extruder which carries the die and the nozzle and/or by adjustment of the position of the mold tunnel.

Further problems have occurred in centering a mandrel within an outer casing of the elongate nozzle to ensure that the extrudate itself emerges having uniform thickness of the wall around its periphery. These subsidiary problems, however, may be approached by providing means for centering the mandrel within the nozzle casing. It is not these subsidiary problems concerning the thickness of the wall of the extrudate which are the concern of the present inventor, but the more basic problem of properly aligning the nozzle with the mold tunnel without the need for adjusting the position of very large pieces of machinery.

Conventionally, in order to adjust the relative position of downstream apparatus with respect to upstream apparatus, it may be necessary to move the relatively massive upstream apparatus or the relatively massive downstream apparatus in both lateral and vertical directions. This may involve a large number of adjusting mechanisms all of which must be relatively sophisticated and heavy duty.

In apparatus for making profiled pipe, for example, annularly or helically ribbed or corrugated double walled pipe, whether the extruder is an in-line feed extruder or a side-feed extruder is an in-line feed extruder or a side-feed extruder, it has been conventional that the die be fixed in position with respect to the extruder. Thus, it has not been possible to adjust the position of the die and elongate extrusion nozzle with respect to the extruder.

It is possible to provide some minor range of adjustment of the extrusion nozzle casing, i.e. the outer casing of the extrusion nozzle with respect to the die casing. The purpose of this range of adjustment is to solve the subsidiary problems referred to above, i.e. to center the extrusion nozzle casing around the mandrel which forms the inner wall of a delivery passage for extrudate and thus allow for the delivery of an extrudate having constant wall thickness. It will be appreciated that relative movement between the extrusion nozzle casing and the mandrel will affect the wall thickness of the extrudate. Movement of the whole extruder including the die, the extrusion nozzle and its inner mandrel will, however, not affect the adjustment between the extrusion nozzle and its inner mandrel.

For whatever reason, it is wholly conventional in the extrusion art as known that adjustment of the upstream and downstream equipment involve the adjustment of the main upstream apparatus and/or the main downstream apparatus.

The present inventor has addressed the problem which arises in adjustment of the massive extruder and mold tunnels.

Since the die together with the extrusion nozzle casing and its associated mandrel is, even when large diameter pipe is to be molded, usually a much smaller part of the apparatus than the extruder or the mold tunnel, the present invention contemplates adjustment of the position of the die together with the extrusion nozzle rather than the mold tunnel or the extruder.

BACKGROUND OF THE INVENTION

According to the invention, there is provided apparatus for forming thermoplastics material elongate extrusion comprising an extruder having an extruder exit passage for extrudate; a die connected to the exit passage of the extruder through an upstream die position having an upstream portion longitudinal axis; an extrusion nozzle connected to a die downstream portion having a downstream portion longitudinal axis; handling apparatus downstream of the die for handling extrudate emerging from the die, the handling apparatus having longitudinal axis inexactly axially aligned with the extruder exit passage; the nozzle having an elongate delivery passage for the delivery of extrudate from the die to the mold tunnel; and means to adjust the position of at least the die downstream portion with respect to the extruder to provide for adjustment alignment of the die downstream longitudinal axis and the handling apparatus longitudinal axis.

Also according to the invention, there is provided an apparatus for forming thermoplastics material pipe comprising an extruder having an extruder exit passage for extrudate; a die connected to the extruder exit passage through an upstream die portion having an upstream die portion longitudinal axis; and elongate extrusion nozzle axially alignable with and connected to a die downstream portion having a downstream portion longitudinal axis; a mold tunnel having a tunnel longitudinal axis inexactly axially aligned with the extruder exit passage; the nozzle having an elongate delivery passage or annular cross section for the delivery of extrudate from the die to the mold tunnel; and adjustment means to adjust the position of at least the die downstream portion to correct any deviation from axial alignment with the mold tunnel. Suitably, apparatus for the manufacture of large diameter pipe may have a die comprising two separate portions, i.e. the die upstream portion and the die downstream portion. The die upstream portion is fixed with respect to the extruder and the die downstream portion is movable with respect to the die upstream portion. The adjustment means act between the die upstream portion and the die downstream portion to adjust the longitudinal axis of the die downstream portion to coincide with that of the mold tunnel. In this case, the die may have a housing comprising a socket part and a spigot part. The socket part may be the upstream portion which is fixed relative to the extruder and the spigot part may be the downstream portion which is adjustable in the socket part to center the longitudinal axis of the spigot portion so that it coincides with the longitudinal axis of the mold tunnel.

The inner surface of the elongate passage may be formed by a mandrel centered axially in the elongate nozzle casing through support means which allows the flow of extrudate through the die. The support means may be a spider and may be fixed or adjustable in the die. Suitably, for the manufacture of large diameter pipe the spider is fixed in the downstream portion of the die. Any adjustment of the elongate nozzle for thickness of the walls of the extrudate may be made by adjusting the position of the elongate nozzle casing with respect to the mandrel.

The extruder may be a side-feed extruder or an inline feed extruder. The adjustment means for adjusting the position of the downstream portion of the die casing with respect to the upstream portion of the die casing may suitably be adjustment screws projecting through the socket wall to adjust the position of the spigot part within it.

Alternatively, the die may comprise a one-piece die. This may be more suitable for the manufacture of small diameter pipe. In this case, the adjustment means acts between the extruder and the die rather than between two parts of a split die. Again, the adjustment means may comprise adjustment screws passing through the socket wall of an upstream socket end of the die to adjust it relative to a fixed spigot end of an extruder passage projecting into the socket.

In this case, the inner surface of the elongate passage may again be formed by a mandrel. The mandrel may, as already described, be carried on a fixed spider. Alternatively, it may be carried on an adjustable spider so that its position within the die may itself be adjustable. There is no special criterion of when an adjustable spider may be used and when a fixed spider is more suitable. However, it is commented that the fixed spider may generally be more suitable for apparatus for the manufacture of large diameter pipe.

SUMMARY OF THE INVENTION

While it is not intended to limit the invention in any way, it may be found that it is particularly suitable for use with apparatus for making profiled pipe such as annularly or helically ribbed or corrugated pipe. Apparatus for the manufacture of such pipe has been particularly massive due to the very large travelling mold tunnels which have conventionally been necessary in this art.

BRIEF DESCRIPTION OF THE DRAWINGS

The above as well as other advantages and features of the present invention may be described in greater detail according to the preferred embodiments in which.

Figure 1:
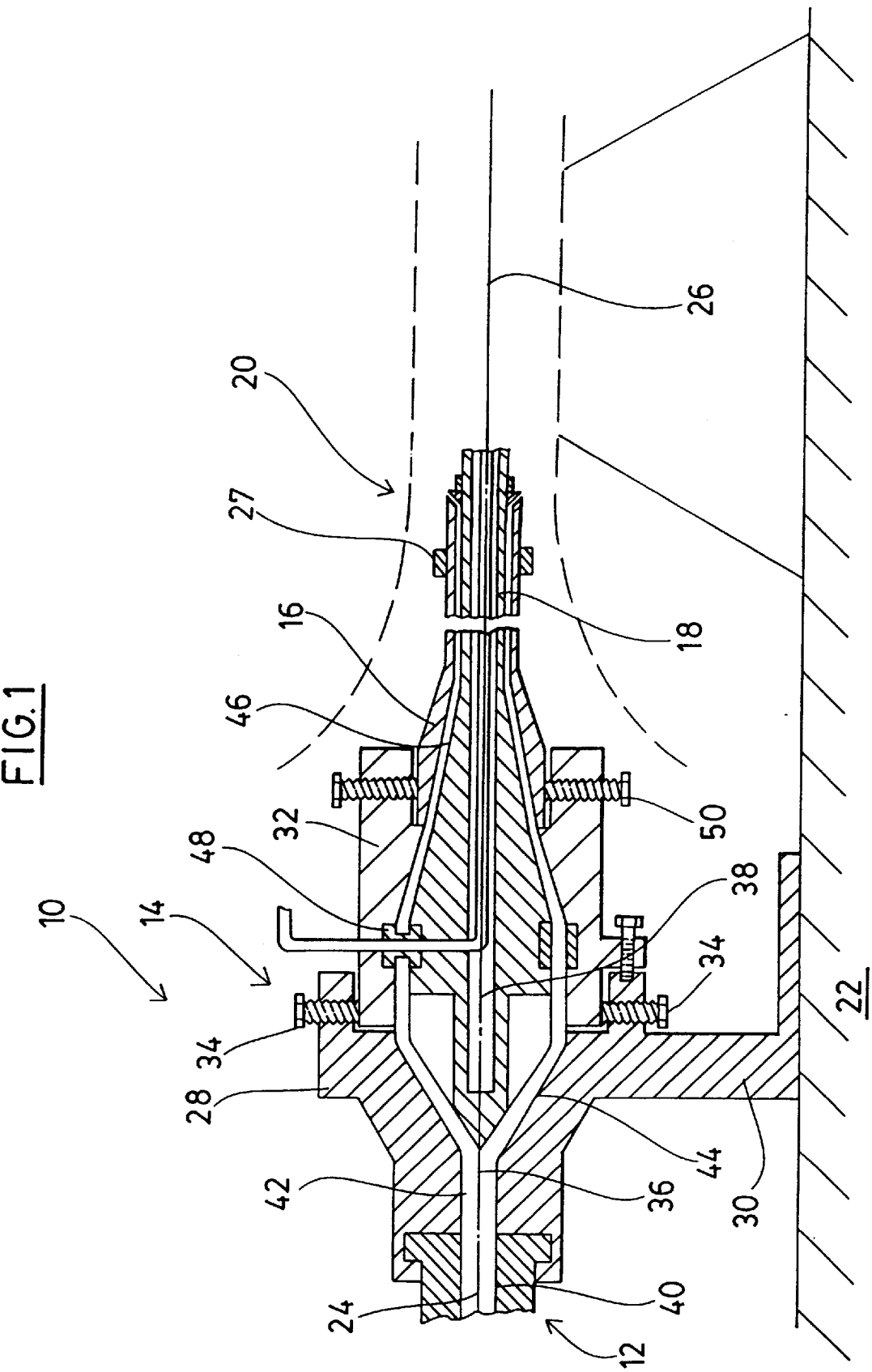
FIG. 1 is a sketch of a longitudinal section through one apparatus according to the invention.

DETAILED DESCRIPTION ACCORDING TO THE PREFERRED EMBODIMENTS OF THE PRESENT INVENTION

In the drawings, pipe making apparatus 10 comprises an extruder 12, a die 14 having an extrusion nozzle casing 16 and a mandrel 18, and a travelling mold tunnel 20. The extruder 12 and the travelling mold tunnel 20 are, as is conventional, supported on the floor 22. If desired, the extruder 12 and the travelling mold tunnel 20 may be provided with adjustment means to bring their longitudinal axis 24 and 26 respectively into alignment. However, such adjustment means are conventional and, if present, are only supplementary to any alignment means of the present invention.

The travelling mold tunnel may be of any tube but, as shown, is indicated generally as being a travelling mold tunnel having two co-operating runs of mold blocks which come together to form the mold tunnel. It will be appreciated at the travelling mold tunnels of other forms such as those including hinged mold blocks or mold blocks having return mechanisms of other types are equally suitable. Indeed, if the pipe being formed is non-profiled pipe, the mold tunnel need not be of the travelling type.

The apparatus illustrated in the drawings may be suitable for the manufacture of profiled pipe such as helically or annularly ribbed pipe or helically or annularly corrugated pipe of either double walled or single walled construction. If the pipe to be formed is of the double walled variety, modifications will be necessary to the die and to the extrusion nozzle for this purpose. These modifications are conventional and form no part of the present invention. It is to be understood that the present invention may be applied to dies and extrusion nozzles suitable for the production of all these types of pipe.

FIG. 1 illustrates apparatus suitable for the production of large diameter pipe. The die 14 comprises a housing including an upstream socket portion 28 which is supported on a stand 30 on the floor 22. The die housing also includes a downstream spigot portion 32 which is adjustable in the socket portion 28 by means of adjusting means 34. The adjusting means are shown as screws but cams or other equivalent means may be used. The adjustment means may be operated automatically by means of sensors 27 in response to the position of the travelling mold tunnel. The upstream socket portion 28 has a longitudinal axis 36 and the downstream spigot portion has a longitudinal axis 38. The upstream socket portion 28 is fixedly connected to an extruder passage 40 of the extruder 12.

The extrusion passage 40 of the extruder 12 is in line with the general direction of flow of extrudate within the die and within the mold tunnel. Mandrel 18 extends upstream from the extrusion nozzle into the die spigot portion 32 and into the die socket portion 28. As extrudate flows in the cylindrical extrusion passage 40 and into a die entry passage 42 coincident with it, the upstream end of the mandrel converts the die entry passage 42 into an initial annular die passage 44 which leads into an extrusion nozzle passage 46 which is also annular. The mandrel 18 is supported in the downstream spigot portion 32 of the die 14 by means of a fixed spider 48 through the arms of which services, such as cooling fluids or pressurizing fluids may be supplied to the hollow core of mandrel 18 for transport to appropriate utilization points.

The apparatus of FIG. 1 may be roughly assembled so that the longitudinal axis 24 of the extruder 12, the longitudinal axis 26 of the mold tunnel 20 and the longitudinal axis 36, 38 of the die portions are generally aligned.

Figure 5:
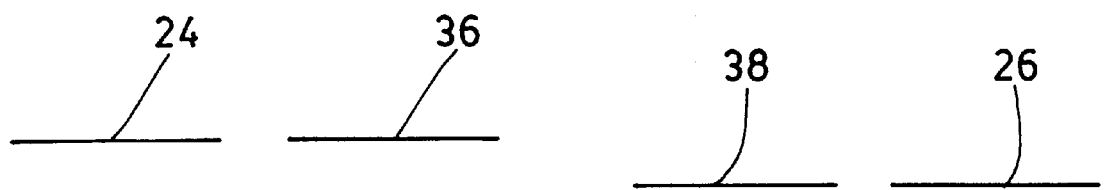
FIG. 5 is a line diagram of the axis of the parts of the apparatus of FIG. 1 and FIG. 3.

More accurate alignment of the longitudinal axis of the extrusion nozzle with axis 26 of mold tunnel 20 may be achieved by relative positioning of the socket die portion 28 and the socket spigot portion 32 by means of adjustment means 34. Thus longitudinal axis 38 of spigot portion 32 and the corresponding longitudinal axis of extrusion nozzle casing 16 will be aligned with longitudinal axis 26 of mold tunnel 20. This accurate alignment may involve the slight offsetting of die axis 36 and 38 with respect to one another. This situation is shown in FIG. 5. The longitudinal axis 36 of socket die portion 28 with longitudinal axis 38 will however be aligned with the axis of the extruder passage 40. When the axis of extruder passage 40 is not exactly aligned with axis 26 of mold tunnel 20, there will be an offset (See FIG. 5) between the axis 36, 38 of the two parts 28, 32 of the split die. If however the initial setting up has been extremely accurate, then all the longitudinal axis may be generally aligned. The offset is made possible by means of adjusting means 34 which adjust the relative positions of the portions 28, 32 of the split die casing with respect to one another. In fact, it is only downstream spigot die portion 32 which moves by the action of the adjusting screws 34 since upstream socket die portion 28 is fixed with respect to extruder 12. Since the downstream spigot portion 32 carries the extrusion nozzle casing 16 and the mandrel 18 on a fixed spider, any movement of the downstream portion 32 is also transmitted to the mandrel and to the extrusion nozzle casing.

Means may be provided for relative adjustment between the extrusion nozzle casing and the mandrel 18 by conventional means. For example, adjustment screws 50 may be provided for adjustment of the position of the extrusion nozzle casing 16 with respect to the mandrel 18. It should however be emphasized that this adjustment only affects the dimensions of the annular extrusion nozzle passage 46. Any adjustment of adjustment means 34 will be transmitted to all of the spigot die portion 32, the mandrel 18 and the extrusion nozzle casing 16.

Even when large diameter pipe is to be manufactured the dimensions and weight of the die 14 are small in comparison with those of the extruder 12 and the mold tunnel 20. When the die casing is split into two parts 28, 32 the size and weight of the movable part is less than that of the whole die. An advantage may be obtained in the provision of the means of adjustment of the die or a portion thereof to align the extrusion nozzle of the mold tunnel over the conventional, time consuming, unwieldy procedures of fine adjustment of the relatively massive extruder or mold tunnel themselves.

Figure 3:
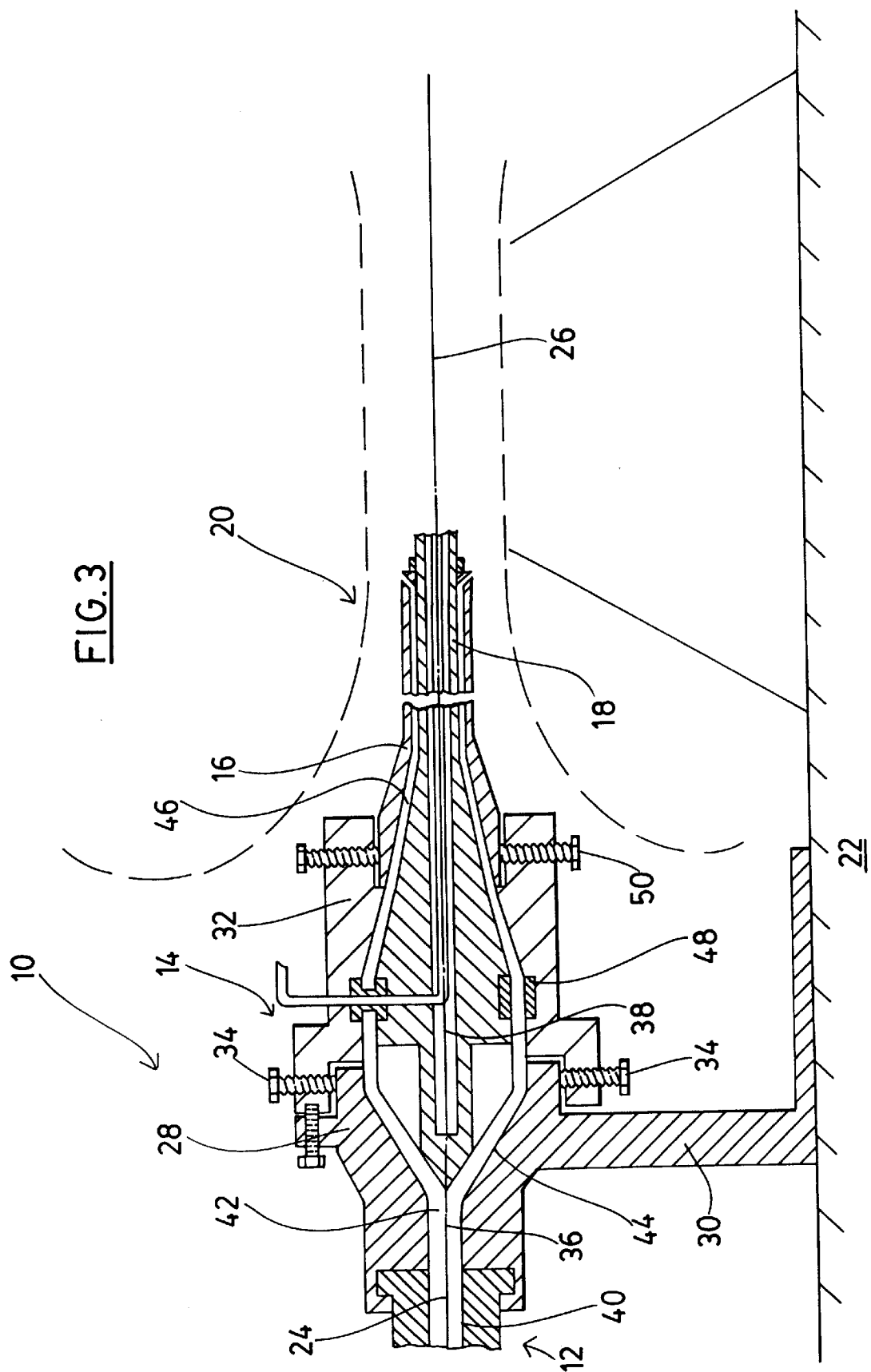
FIG. 3 is a sketch of yet another embodiment of apparatus according to the invention.

It is clear that the fixed portion of the die casing may be the socket portion as shown in FIG. 1 or it may be the spigot portion as shown in FIG. 3. FIG. 3 indicates very similar apparatus to that of FIG. 1 with the exception that the fixed die casing portion 28 is the spigot portion and stands on stand 30 to be supported by the floor 22. In this case, the movable die portion 32 is the socket portion. Similar reference numerals are used in FIGS. 1 and 3 to indicate similar parts.

Figure 2:
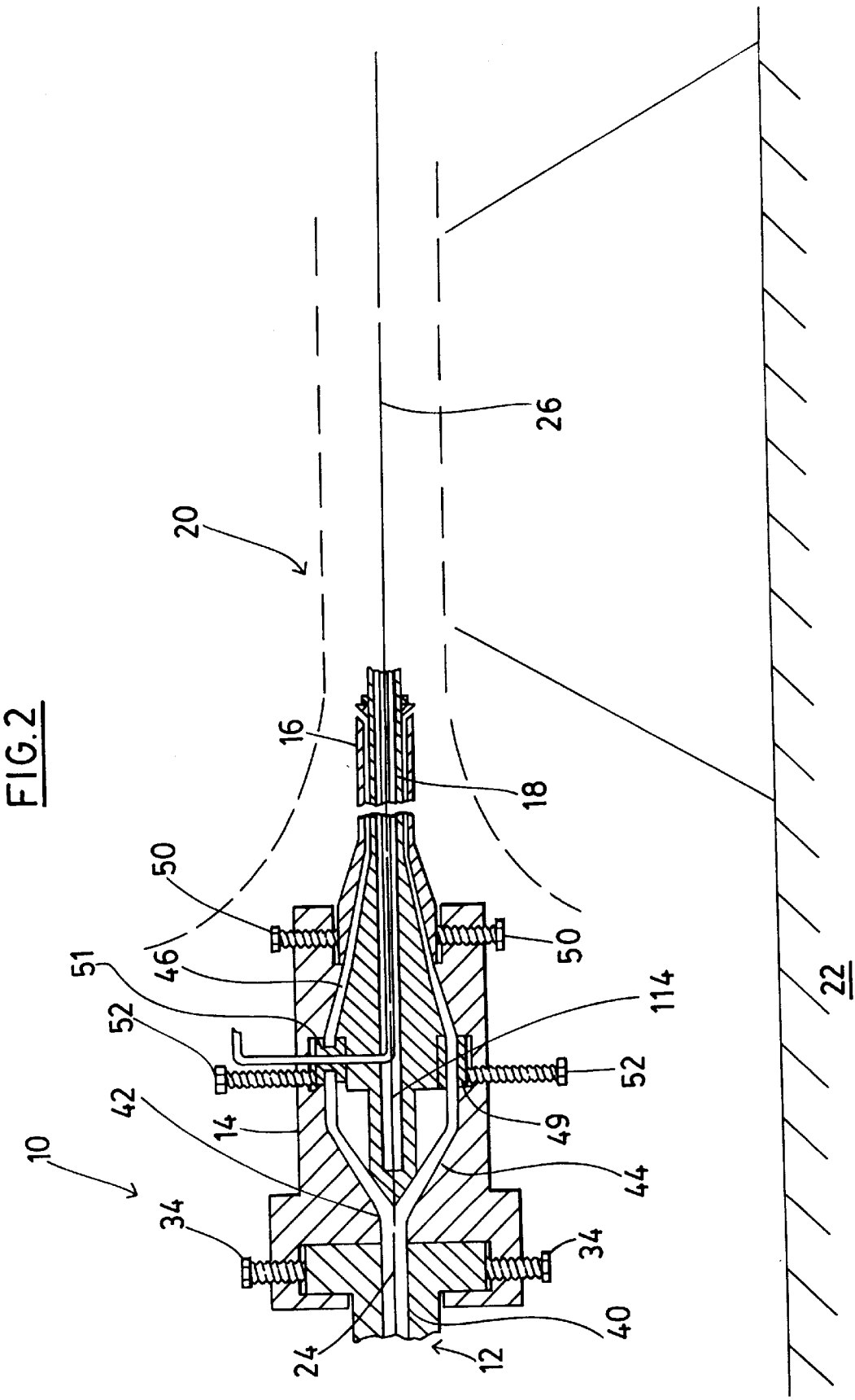
FIG. 2 is a sketch of another apparatus according to the invention.
Figure 6:
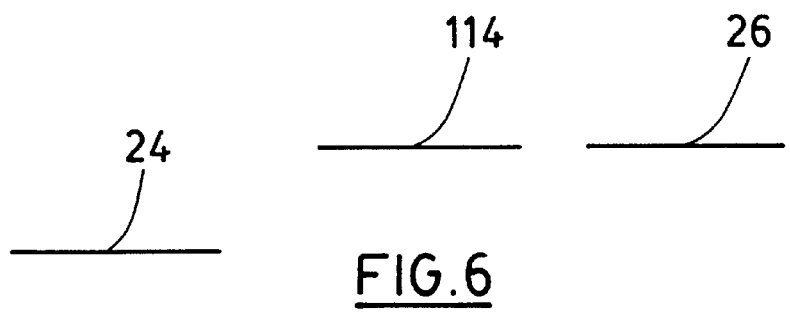
FIG. 6 is a line diagram of the axis of the parts of the apparatus of FIG. 2.

When smaller diameter pipe is to be molded, it may not be necessary to provide the adjustable die as two separate portions. FIG. 2 shows another embodiment of apparatus according to the invention in which the die 14 is not split but comprises a single part. As in FIGS. 1 and 3 similar reference numerals are used to indicate similar parts where possible. However, in FIG. 2 no parts 28 and 32 are present. The die 14 itself is adjustable with respect to extruder 12 passage 40 of extruder 12 by means of adjustment means 34. By operation of adjustment means 34, the whole of die 14 in FIG. 2 is movable relative to extruder 12 to adjust the position of its longitudinal axis 114 to coincide with the longitudinal axis 26 of mold tunnel 20. Any offset 35 will be between the axis of extruder passage 40 and the die axis 114. This is best shown in FIG. 6.

In this case, a further fine adjustment is possible in that an adjustable spider 49 having service line 51 is provided, of the spider being adjustable by means of adjustment screws 52. This makes possible to adjust the position of mandrel 18 with respect to the longitudinal axis 114 of die 14 and with respect to the longitudinal axis 26 of mold tunnel 20. Provided that the extrusion nozzle casing 16 is also adjustable, for example by means of adjustment screws 50 so that the width of annular extrusion channel 46 may be maintained constant, the provision of the adjustable spider may provide for further fine adjustment.

Figure 4:
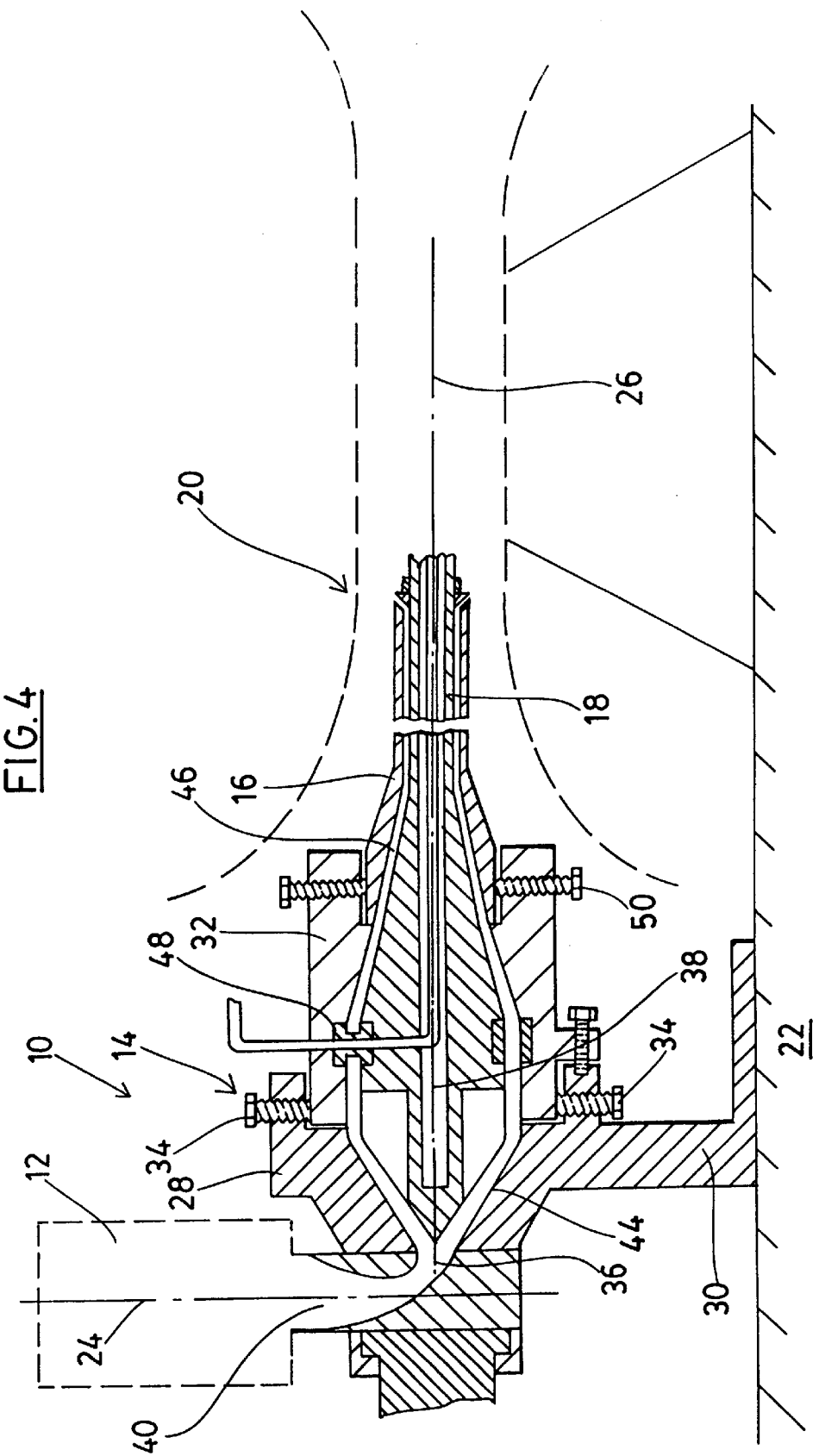
FIG. 4 is a rough sketch of apparatus according to the invention including a side feed extruder.
Figure 7:
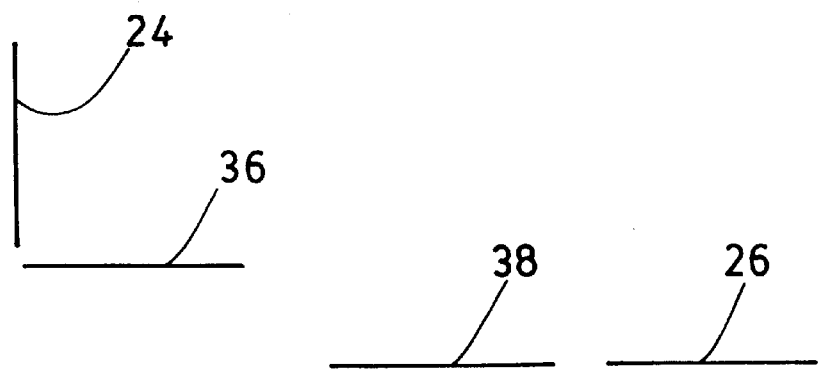
FIG. 7 is a line diagram of the axis of the parts of the apparatus of FIG. 4

FIG. 4 shows a sketch of an adjustable die used with a side feed extruder. The use of a side feed extruder does not influence the detail of the invention. The axis 24 of the extruder 12 is not even generally aligned with the die and tunnel axis but may be at as much as 90° to them. This is, however immaterial since die part 28 is fixed in relation to the extruder and adjustment of die part 32 alters the position of die part axis 38 to coincide with tunnel axis 26 (see FIG. 7).

Although various preferred embodiments of the present invention have been described herein in detail, it will be appreciated by those skilled in the art, that variations may be made thereto without departing from the spirit of the invention or the scope of the appended claims.

What is claimed is:

1. Apparatus for forming thermoplastics material elongate extrusion comprising;

an extruder having an extruder exit passage for extrudate;

a die having an upstream housing portion and a downstream housing portion, the die being connected to the exit passage of the extruder through the upstream housing portion having an upstream portion longitudinal axis;

an elongate extrusion nozzle connected to the downstream housing portion which has a downstream portion longitudinal axis;

handling apparatus downstream of the die for handling extrudate emerging from the die, the handling apparatus having a longitudinal axis;

the nozzle having an elongate delivery passage for the delivery of extrudate from the die to the handling apparatus; and means to adjust the position of at least the die downstream portion and the elongate extrusion nozzle connected thereto with respect to the extruder to enable alignment of the die downstream longitudinal axis and the nozzle with the handling apparatus longitudinal axis.

2. Apparatus for forming thermoplastics material pipe comprising;

an extruder having an extruder exit passage for extrudate;

a die having an upstream housing portion and a downstream housing portion, the upstream housing portion being connected to the exit passage of the extruder and having an upstream portion longitudinal axis;

an elongate extrusion nozzle connected to the downstream housing portion and having a downstream portion longitudinal axis;

a mold tunnel having a tunnel longitudinal axis;

the nozzle having an elongate delivery passage of annular cross section for the delivery of extrudate from the die to the mold tunnel; and means to adjust the position of at least the die downstream portion and the nozzle connected therewith with respect to the extruder to enable adjustment alignment of the die downstream longitudinal axis and the tunnel longitudinal axis.

3. Apparatus as claimed in claim 2, in which the upstream housing portion of the die is fixed with respect to the extruder, the downstream housing portion of the die is movable with respect to the upstream housing portion, and the adjustment means act between the upstream housing portion and the downstream housing portion.

4. Apparatus as claimed in claim 3, in which the housing portions of the die comprise a socket part and a spigot part, one part of which is fixed relative to the extruder and the other of which is adjustable with respect to the one part which is fixed to center the downstream portion longitudinal axis with the longitudinal axis of the mold tunnel.

5. Apparatus as claimed in claim 4, in which said one part is the socket part and said other part is the spigot part.

6. Apparatus as claimed in claim 4, in which an inner surface of the elongate delivery passage of the nozzle is formed by a mandrel centered axially in the nozzle by support means allowing flow of extrudate through the die, the support means being fixed with respect to the downstream housing portion of the die.

7. Apparatus as claimed in claim 4, in which the extruder is an in-line extruder.

8. Apparatus as claimed in claim 4, in which the extruder is a side-feed extruder.

9. Apparatus as claimed in claim 3, in which the adjustment means comprise adjustment screws acting between the upstream housing portion and the downstream housing portion of the die.

10. Apparatus as claimed in claim 2, in which the upstream housing portion and downstream housing portion of the die are integral and the adjustment means acts between the extruder and the die.

11. Apparatus as claimed in claim 10, in which an inner surface of the elongate passage is formed by a mandrel centerable axially in the elongate nozzle through support means which is adjustable in the die and which allows flow of extrudate through the die.

12. Apparatus as claimed in claim 10, in which the extruder exit passage is generally aligned with the die upstream longitudinal axis and the die downstream longitudinal axis.

* * * * *